| United States Patent [19] | [11] | 4,305,830 |
|---|---|---|
| Shimura | [45] | Dec. 15, 1981 |

[54] WATER SURFACE CLEANER, METHOD AND APPARATUS

[75] Inventor: Masuo Shimura, 47, Ohashi-machi 2-chome, Minami-ku, Yokohama-shi, Kanagawa-ken, Japan

[73] Assignees: Arvin Fay Christensen; Mihoko Shimura Christensen, both of Ririe, Id.; Kaoru Shimura; Masuo Shimura, both of Yokohama, Japan

[21] Appl. No.: 125,312

[22] Filed: Feb. 27, 1980

[51] Int. Cl.³ .............................................. E02B 15/04
[52] U.S. Cl. ................................. 210/801; 210/923; 210/242.3
[58] Field of Search ............ 210/85, 242 S, DIG. 25, 210/169, 801; 15/1.7; 114/144 A

[56] References Cited

U.S. PATENT DOCUMENTS

| 2,902,705 | 9/1959 | Eistrup | 15/1.7 |
| 3,689,927 | 9/1972 | Boston | 114/144 A |
| 3,700,108 | 10/1972 | Richards | 210/242 S |
| 3,765,362 | 10/1973 | Gitchel | 114/144 A |
| 3,767,055 | 10/1973 | Flatland | 210/169 |
| 3,860,518 | 1/1975 | Henrickson | 210/169 |
| 4,006,082 | 5/1975 | Irons | 210/242 |
| 4,033,876 | 7/1977 | Cogin et al. | 210/242 |
| 4,089,074 | 5/1978 | Sermons | 210/169 |
| 4,100,072 | 7/1978 | Uchida et al. | 210/242 S |
| 4,111,811 | 9/1978 | Fukuda | 210/242 |
| 4,128,068 | 12/1978 | Ogura | 210/242.3 |
| 4,136,030 | 1/1979 | Seike | 210/242 |

Primary Examiner—Theodore A. Granger
Attorney, Agent, or Firm—James C. Wray

[57] ABSTRACT

The invention relates to a water surface cleaner method and apparatus for suctioning flotage such as oil, pollutants, floating debris and the like from water surfaces. A water guide passage extends between front and rear ends of a floating body. Exhaust flow of a pump generates an effective surface current in front of the body and through the passage. A flotage collecting section is provided at the rear end of the water guide passage. Buoyant means support the flotage collecting section at and under the water surface. A propeller system is connected to a radio control receiver provided on said body.

25 Claims, 9 Drawing Figures

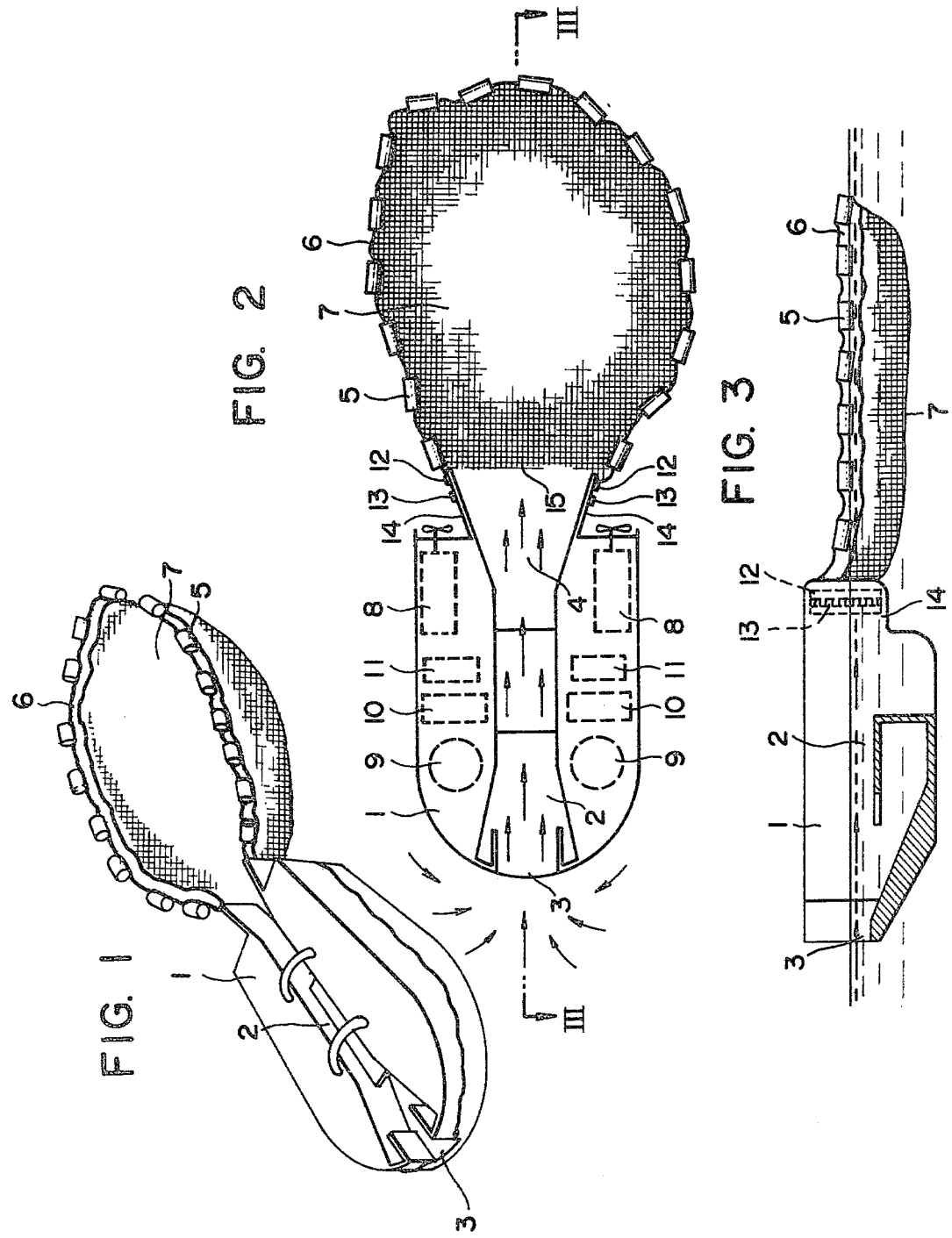

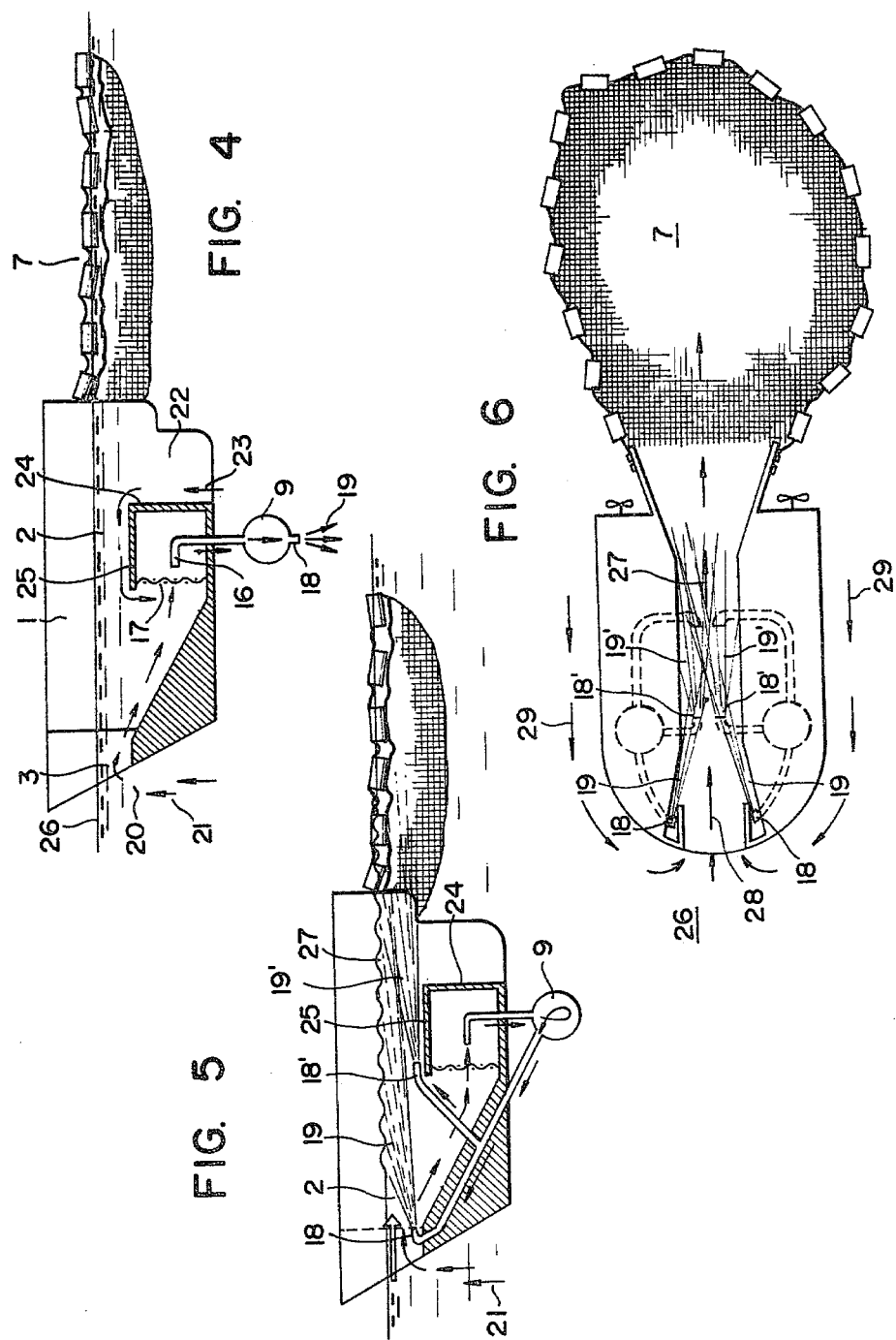

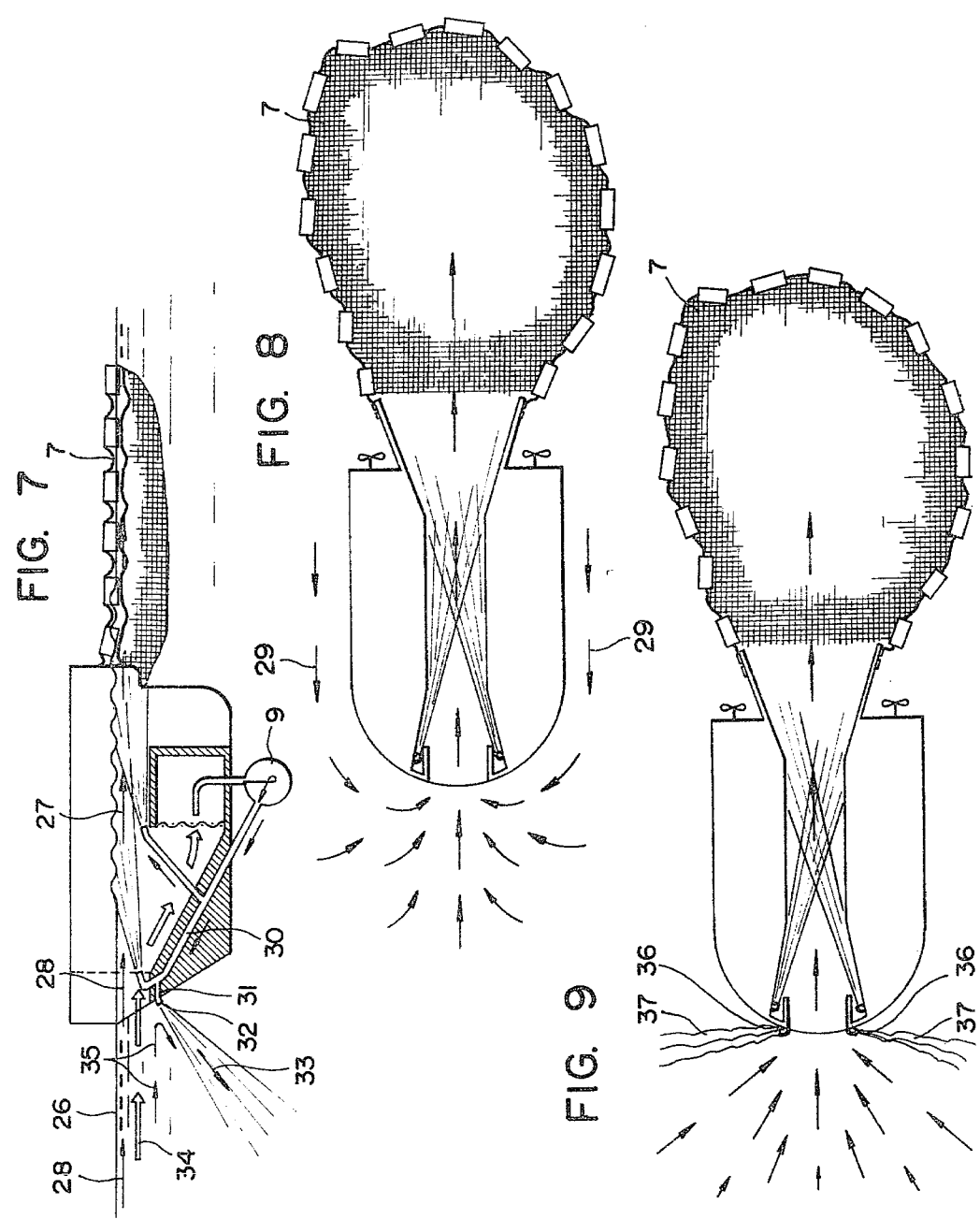

WATER SURFACE CLEANER, METHOD AND APPARATUS

BACKGROUND OF THE INVENTION

Heretofore, dust removing boats and oil recovery boats have been used to clean pollutants, flotage and the like on wide water surfaces such as seas and lakes. However, no consideration has been given to cleaning inland narrow water surfaces such as rivers, moats, ponds and pools, and there has been no effective means other than merely letting water carry away pollutants in a fixed direction.

SUMMARY OF THE INVENTION

The primary object of the present invention is to provide a water surface cleaner method and apparatus capable of efficiently collecting or recovering pollutants on narrow water surfaces. The water surface cleaner should satisfy the following requirements:

First, its body should be of sufficiently small size and light weight to carry with ease. For floating the body on water surfaces, it is not desirable to depend on a number of men or machines such as cranes.

Second, pollutant collection capacity should be as great as possible. If a dust or oil collecting tank were built into the body, as in the case of a cleaning ship, the tank would be required to be small both in size and in collection capacity, since the body is naturally small. If a large collection tank were used, the body would be required to be large in size, and the body could not be made light in weight. Therefore, a collection tank should be provided outside the body.

Third, the body should have a high efficiency pollutant collecting tank even though it is small in size. For this reason, pollutant flow into the pollutant collecting tank is required to be made effective.

Another object of the invention is to provide a water surface cleaner in which a water guide passage for passing pollutants and the like therethrough is provided in a body which is floatable on water surfaces, and a water surface flotage collecting section made of a porous material such as nets, baskets and clothes is placed at one end of the guide passage, so that the pollutants and the like coming in through the guide passage may be introduced and collected in the water surface flotage collecting section.

A further object of the invention is to provide a water surface cleaner in which a propeller system connected to a radio control receiver is fitted in the floatable body provided with a water guide passage and a water surface flotage collecting section, which propeller system is driven under remote control to make forward and backward motions as well as steering operations, so that the body may be transferred in any desired direction by remote operator instructions to recover pollutants and the like on water surfaces.

A still further object of the invention will be apparent from the embodiments described hereunder in connection with the accompanying drawings.

BRIEF DESCRIPTION OF THE DRAWINGS

FIG. 1 is a perspective view of an embodiment of the water surface cleaner of the invention.

FIG. 2 is a plan view of embodiment shown in FIG. 1.

FIG. 3 is a longitudinal sectional view taken on line III—III of FIG. 2.

FIG. 4 is a longitudinal sectional view of the suction process of the pump employed in the embodiment.

FIG. 5 is a longitudinal sectional view of an experimental example of the invention.

FIG. 6 is a plan view of the experimental example shown in FIG. 5.

FIG. 7 is a longitudinal sectional view of an embodiment of the invention.

FIG. 8 is a plan view of the embodiment shown in FIG. 7.

FIG. 9 shows a further embodiment of the invention.

DETAILED DESCRIPTION OF THE DRAWINGS

Referring first to the construction of FIGS. 1 through 3, the body 1 of the water surface cleaner is of so light weight that it is handy to carry. The body 1 is made of light metal, plastic or the like and is provided with a pump 9, a propeller system 8, a battery source 10 and a radio control receiver 11. The drive of the pump 9 or the propeller system 8 is controlled by the radio control receiver 11. A water guide passage 2 is extended through the body 1 from an intake port 3 at the front end to the rear end 4 thereof. An open section of a net 7 is hung at and under water surface on floats 5 made of foamed polystyrene, and is fastened on the tips of the side walls 14 on the both sides at the rear end 4 of the body 1. A water surface flotage collecting section is formed by the net. The net 7 is formed with a bottom or is formed as an unbottomed cylinder. The net 7 may be replaced with a basket, a cloth or the like. Furthermore, the net is a porous material with a sufficiently small mesh to capture dust and oil, which are typical pollutants. In the embodiment, the net 7 readily can be connected with and detached from the body 1 by using fasteners 12 and 13 fitted on the net 7 and on the tip of the current plates 14 provided on the rear end of the body 1, respectively.

The connection between the body 1 and the net is not limited to the fasteners but it may be made by interlocking means.

Moreover, the connecting sections may be fixed instead of being attachable and detachable means. The net 7 is open at the place indicated by numeral 15. Pollutants and the like on the water carried through the water guide passage 2 are collected in the net 7. Small width vinyl film 6 is attached to the upper edge of the net 7 to prevent the outflow of recovered oil. Since the net 7 is freely detachable, capacity for collecting pollutants can be increased by employing another net with a larger extension size if required. Further, the water surface cleaner can be carried easily with the net 7 removed from the body 1.

Referring to FIG. 4, the principle of the invention is explained on the supposition that water surface pollutants are collected by operating the pump 9, which is illustrated as installed at a suppositional place for the convenience of explanation. Actually, however, the pump is mounted on both sides or a single side of a boat of the kind as shown in FIG. 2. In the drawing, the pump 9 driven by the power supply of battery 10 is provided in the body 1, and a suction port 16 and a filter 17 are provided below intermediate floor 25 of the water guide passage 2. The pump 9 is furnished so that the exhaust port 18 thereof may perform discharge from the body 1. The guide water passage 2 is provided with the intake port 3 placed at the front end of the body 1. The passage 2 leads to the flotage collecting section made of a porous material attached to the rear end of the body 1. When water is sucked from a suction port 16 through a filter 17 and discharge flow 19 is released from an exhaust port 18 out of the body 1 by driving the pump 9, suction flow carries upflow 21 from the water region 20 at the forward area of the intake port 3, and upflow 23 from the rearward water region 22, of the intake port 3. The upflow 23 upwardly flows along the side walls 24 at the rear end of the water guide passage 2 and flows in arrow-indicated direction above the intermediate floor 25 to lead to the suction port 16. In this condition, no suction flow is generated on the forward water surface 26 at the intake port 3.

FIG. 5 is a sectional view of a modification made by obviating the defect of the experimental example shown in FIG. 4. The exhaust ports 18 and 18' of the pump 9 are set in the water guide passage 2 below the water surface to release discharge flows 19 and 19' rearward, so that the discharge flows 19 and 19' may form an acute angle with the water surface in the water guide passage 2. The water depth between the intermediate floor 25 of the water guide passage 2 and the water surface is adjusted to 3–5 cm. Since the depth of water is shallow, the upflow 23 from the water region 22 at the rearward area of the body 1 shown in FIG. 4 is carried away by the discharge flows 19 and 19' and disappears. Therefore, suction flow drawn into the pump 9 becomes only that flow coming in from the suction port 3. Of such a flow, the lowermost layer is sucked through the suction port 16 of the pump 9 and is released as discharge flows 19 and 19' through discharge ports 18 and 18', and flows as rapid flow 27 on the surface in the water guide passage 2. The rapid flow 35 causes a surface current on the water surfaces in the vicinity of the intake port 3 and outside the body 1, thereby accelerating the suction flow of the pump 9. It has been learned through analysis that thus obtained combined suction flow consists of the upflow 21 from the water immediately in front of the intake port 3 and the surface current 29 flowing from the both sides of the body 1 toward the intake port 3. (See FIG. 6.)

FIG. 6 is a plan view of the embodiment shown in FIG. 5. In the drawing, a surface current 28 caused by the rapid flow 27 is generated in the water guide passage 2. A surface current 29 caused by the rapid flow 27 so as to flow from the both sides of the body 1 toward the intake port 3 is generated on the water surface outside of the body 1. Another surface current occurs on the water surface 26 at the forward area of the intake port 3 for four to five seconds after the start of the drive of the pump 9, but that current disappears entirely and changes into the upward current 21 from the water region immediately in front of the intake port 3. (See FIG. 5.)

FIG. 7 is a sectional view of the embodiment of the means for generating a surface current on the water surface 26 at the forward area of the intake port 3. In FIG. 7, a branch pipe 31 is provided on the exhaust pipe 30 of the pump 9, and an exhaust port 32 is provided in the lower section of the intake port 3. If the discharge flow 33 of the pump 9 is released downward of the water surface while directed from the exhaust port 32 forward of the intake port 3, the upflow 21 shown in FIG. 5 disappears and is changed into a surface current 34. Thus, the whole suction force of the pump 9 can be concentrated on the surface of only the surface current 34. In this case, the discharge flow 33, released in slantingly downward and forward directions inclusive of horizontal plane, is permitted to be made by setting the exhaust port 32 itself of the branch pipe 31 in the above mentioned directions, or by setting the exhaust port 32 itself upward from horizontal plane and providing in front of the exhaust port 32 a current deflection plate (not illustrated) for directing the disharge current 33 horizontally or slantingly downward and forward. Further, a current 35 is attracted toward the exhaust port 32, through which the discharge flow 33 is released rapidly. The current 35 increases the flow velocity of the surface current 34. The flow velocity of the surface current 34 and the scope of the effect of suction force on the water surface increase in proportion to release flow velocity. Thus, surface currents are not generated by a single means, but through the combined function of various means, i.e.:

Suction flow of pump 9 creates surface current 34.

Current 28 is surface flow caused by rapid flow 27.

Current 35 is current attracted toward exhaust port 32.

In the embodiment, water flow is permitted to be released rearward from water surface as well as from thereunder.

FIG. 8 is a plan view of the embodiment shown in FIG. 7.

FIG. 9 is a plan view of a means for increasing the effect of suction by concentrating particularly on the forward water surface, the surface current shown in FIG. 8. In the drawing, if a discharge flow 37 is directed to the water surface in right and left slantingly forward directions against the moving forward direction of the body 1 as illustrated by setting the exhaust port 36 of the branch pipe of the discharge pipe 30 of the pump 9 in the vicinity of the both sides of the intake port 3, the surface current 29 (See FIGS. 6 and 8) from the both sides of the body 1 to the intake port 3 disappears. Thus, the effect of suction can be increased by collecting the surface current at the water surface forward of the intake port 3.

It has been confirmed through experiments that so intense surface currents are generated by combining the means described heretofore as are capable of collecting through rapidly suctioning flotage at a distance of about two meters forward of the body 1, kept stationary on the water surface.

Next, the most desirable form of the body will be mentioned hereunder.

| | |
|---|---|
| Overall length of body: | 70 cm |
| Overall width of body: | 35 cm |
| Width of water guide passage: | 10 cm |
| Height of body: | 15 cm |
| Weight of body: | 2 kg |
| Weight of propeller system with radio control: | 1 kg |
| Weight of pump (suction capacity: 1.5 KL/hr. × 2): | 2.0 kg × 2 (both sides) |
| Weight of battery: | 1.5 kg |
| Gross weight: | 8.5 kg |

Of course, the form can be desirably changed, if required.

The body thus constructed is placed on water surface and is directed to a desired place by a controller operating a radio control transmitter on the land. The body collects pollutants and the like from the water surface in the net, which is the collecting section. When a proper amount of pollutants and the like are collected, the body is directed to the shore and the pollutants and the like are emptied from the collecting section. Thus, the collection or recovery of pollutants and the like can be repeated in a similar manner.

What is claimed is:

1. A water surface cleaner comprising a body floatable on a water surface, the body having a water guide passage extending therethrough, having an intake port and a rear end respectively adjacent front and rear ends of said body, a surface current generating means for generating on the water surface foward of said body an effective current flowing toward said water guide passage, a water surface flotage collecting system provided at the rear end of the body and connected with said water guide passage, and a float means for hanging said surface flotage collecting section at and under the water surface, said surface current generating means comprising a pump with an inlet for sucking water present in said water guide passage, conduit means connected to the pump outlet and a first nozzle for discharging water into said passage in the general direction of the rear end of the body, and second conduit means connected to said pump outlet and constructed and arranged to discharge water from a second nozzle in a direction generally opposite the first nozzle.

2. A water surface cleaner as claimed in claim 1, further comprising a power source, on the body a propulsion means connected to the power source, a radio control receiver means provided on said body for controlling movement of the body by the power sources and propulsion means.

3. A water surface cleaner as claimed in claim 1, wherein the current generating means comprises a pump mounted in the body and having an inlet in the body communicating with a lower region of the passage and having a first nozzle positioned adjacent to passage and directed rearward in the passage for discharging water rearward in the passage and having a second nozzle positioned forward on the body near a front end thereof and directed outward into an area of water near a front end of the body.

4. A water surface cleaner as claimed in claim 3 wherein the second nozzle comprises an outlet positioned in the front end of the body below a front end of the passage and directed downward and forward into water in front of the body whereby a surface current is generated in a direction leading into the front end of the passage.

5. A water surface cleaner as claimed in claim 3 wherein the second nozzle means comprises plural outlet means mounted in the front end of the body near lateral extremities of a front end of the passage for discharging water outward laterally and forward of the body for generating the effective current flowing toward the front end of the water guide passage.

6. A water surface cleaner as claimed in claim 1, wherein said surface float collecting section is detachably fitted on said body.

7. A water surface cleaner as claimed in claim 1, wherein said surface float collecting section is fastened on said body.

8. A water surface cleaner as claimed in claim 1, wherein said surface float collecting section is constituted of a porous material.

9. A water surface cleaner as claimed in claim 8, wherein said porous material is a net.

10. A water surface cleaner as claimed in claim 8, wherein said porous material is a basket.

11. A water surface cleaner as claimed in claim 8, wherein said porous material is a cloth.

12. A water surface cleaner as claimed in claim 1, wherein said surface float collecting section is bottomed.

13. A water surface cleaner as claimed in claim 1, wherein said surface float collecting section is unbottomed.

14. A water surface cleaner as claimed in claim 1, wherein said surface float collecting section comprises a horizontally elongated vertically relatively short flexible member attached to the float means and extending above and below the water surface for preventing outward flow of collected matter on the water surface.

15. A water surface cleaner as claimed in claim 1, further comprising divergent plates mounted on the rear end of the body at lateral extremities of the rear end of the passage, the plates forming a rearward continuation of the pasage and of the rear end of the body and wherein the collecting section is connected to the plates.

16. A water surface cleaner comprising a body floatable on a water surface, the body having a water guide passage extending therethrough, having an intake port and a rear end respectively adjacent front and rear ends of said body, a surface current generating means for generating on the water surface forward of said body an effective current flowing toward said water guide passage, a water surface floatage collecting system provided at the rear end of the body and connected with said water guide passage, and a float means for hanging said surface floatage correcting section at and under the water surface, said surface current generating means comprising a pump with an inlet communicating with a lower region of the passage for sucking water present in said water guide passage, and conduit means connected to the pump outlet and a nozzle for discharging water into said passage in the general direction of the rear end of the body, and an enclosure formed on the body in the lower region of the water guide passage, said enclosure substantially surrounding the inlet and having an opening facing the front end of the body to permit said inlet to suck water into said enclosure.

17. The apparatus of claim 16 wherein the enclosure comprises a first horizontal planar member located in the lower region of the water guide passage, a second horizontal planar member in the water guide passage spaced above the first horizontal planar member, said first and second horizontal planar Members having front and rear edges facing the front and rear ends respectively of the body and side edges facing the sides of the body, and vertical members extending between the first and second horizontal planar members along the rear and side edges of said horizontal planar members.

18. The apparatus of claim 16 wherein the body is provided with a floor member in the water guide passage extending forwardly upwardly from the lower region of the passage adjacent the opening in the enclosure toward the front end of the water guide passage.

19. The apparatus of claim 16 wherein a filter is provided on the enclosure extending across the opening therein.

20. The apparatus of claim 16 wherein the conduit means is connected to a first nozzle located near the front end of the water guide passage and a second nozzle located adjacent said enclosure, said first and second nozzles directing water into said passage in the general direction of the rear end of the body.

21. The method of water surface cleaning comprising advancing a floatable body with a water passage extending therethrough from a front to a rear end thereof, generating in water forward of the body an effective current flowing from a front end of the water guide passage to the rearward, sucking water present in the water guide passage, discharging water into said passage in the general direction of the rear end of the body, and discharging water in a generally opposite direction forwardly of the front end of the water guide passage, collecting material flowing outward from a rear end of the body and the water guide passage in a floating collecting means connected to the rear end of the body.

22. The method as claimed in claim 21 further comprising moving the body with a propulsion means mounted on the body and controlling the propulsion means with a radio control receiver mounted on the body.

23. The method of claim 21 wherein the generating comprises sucking water from a lower region of the guide passage into a pump and discharging water from the pump generally rearward in the guide passage and generally forward of the body.

24. The method of claim 23 wherein the discharging comprises discharging water forward and laterally outward from a front end of the body.

25. The method of claim 23 wherein the discharging means comprises discharging water downward and forward into water in front of the body.

* * * * *